(12) United States Patent
Holtmanns (10) Patent No.: US 9,763,080 B2
(45) Date of Patent: Sep. 12, 2017

(54) METHOD AND APPARATUS FOR SELECTIVELY ACTIVATING MULTIPLE SUBSCRIBER IDENTITY MODULES

(75) Inventor: Silke Holtmanns, Klaukkala (FI)

(73) Assignee: Nokia Technologies Oy, Espoo (FI)

(*) Notice: Subject to any disclaimer, the term of this patent is extended or adjusted under 35 U.S.C. 154(b) by 192 days.

(21) Appl. No.: 14/367,933

(22) PCT Filed: Dec. 23, 2011

(86) PCT No.: PCT/IB2011/055949
§ 371 (c)(1),
(2), (4) Date: Jun. 22, 2014

(87) PCT Pub. No.: WO03/056855
PCT Pub. Date: Jul. 10, 2003

(65) Prior Publication Data
US 2014/0323117 A1    Oct. 30, 2014

(51) Int. Cl.
*H04M 3/00*    (2006.01)
*H04W 8/22*    (2009.01)
(Continued)

(52) U.S. Cl.
CPC ......... *H04W 8/22* (2013.01); *H04M 1/72566* (2013.01); *H04W 8/245* (2013.01)

(58) Field of Classification Search
CPC .. H04W 4/16; H04W 8/245; H04L 29/08108; H04B 1/3816; H04M 3/54
(Continued)

(56) References Cited

U.S. PATENT DOCUMENTS 5,933,785 A * 8/1999 Tayloe ............... H04W 8/26
455/435.2
5,987,325 A   11/1999 Tayloe
(Continued)

FOREIGN PATENT DOCUMENTS

CN    1238894 A    12/1999
CN   101222711 A    7/2008
(Continued)

OTHER PUBLICATIONS

Office action received for corresponding Chinese Patent Application No. 201180075705.4, dated Sep. 21, 2015, 7 pages of office action and 3 pages of office action translation available.
(Continued)

*Primary Examiner* — Steve D Agosta
(74) *Attorney, Agent, or Firm* — Alston & Bird LLP (57) ABSTRACT

A method, apparatus and computer program product are provided to selectively establish communications with one or more of a plurality of mobile terminals in accordance with a predefined criteria, such as a predefined schedule. In the context of a method, a mobile terminal maintains at least a first subscriber identity module (SIM) and a second SIM is mapped to different subscriber identification numbers. In this regard, the second SIM is mapped to the same subscriber identification number as the SIM of at least one other mobile terminal. The method may also activate the second SIM in accordance with a predefined criteria and may then subsequently deactivate the second SIM. For example, the second SIM may be activated and subsequently deactivated in accordance with a predefined schedule, such as a shift schedule, that identifies one or more time periods in which the second SIM is to be activated.

14 Claims, 5 Drawing Sheets

(51) Int. Cl.
*H04M 1/725* (2006.01)
*H04W 8/24* (2009.01)

(58) Field of Classification Search
USPC .................... 455/414.1, 417, 418–420, 558; 379/211.01, 211.02
See application file for complete search history.

(56) References Cited

U.S. PATENT DOCUMENTS

| | | | |
|---|---|---|---|
| 6,327,353 B1* | 12/2001 | Fukuzawa | H04M 3/22 379/201.01 |
| 6,738,622 B1 | 5/2004 | Stadelmann et al. | |
| 7,945,244 B1* | 5/2011 | Delaet | G06Q 30/0207 455/410 |
| 8,018,865 B2* | 9/2011 | Fan | H04W 92/08 370/252 |
| 8,190,196 B2* | 5/2012 | Billmaier | H04W 8/26 370/395.2 |
| 8,781,454 B2* | 7/2014 | Li | H04W 4/16 455/417 |
| 2004/0229600 A1 | 11/2004 | Saez | |
| 2004/0229601 A1 | 11/2004 | Zabawskyj et al. | |
| 2005/0075106 A1 | 4/2005 | Jiang | |
| 2010/0130254 A1* | 5/2010 | Kamada | H04L 63/0853 455/558 |
| 2011/0059738 A1* | 3/2011 | Waller | H04W 8/26 455/433 |
| 2013/0017806 A1* | 1/2013 | Sprigg | H04M 1/66 455/411 |

FOREIGN PATENT DOCUMENTS

| | | |
|---|---|---|
| CN | 101400186 A | 4/2009 |
| CN | 101662848 A | 3/2010 |
| EP | 1098543 A1 | 5/2001 |
| GB | 2428942 A | 2/2007 |
| IN | 1179/CHE/2007 A | 12/2008 |
| WO | 98/24257 A1 | 6/1998 |
| WO | 03056855 A1 | 7/2003 |
| WO | 2005018245 A2 | 2/2005 |

OTHER PUBLICATIONS

Extended European Search Report received for corresponding European Patent Application No. 11877727.5, dated Jul. 22, 2015, 7 pages.

Office action received for corresponding Chinese Patent Application No. 201180075705.4, dated Jan. 4, 2015, 8 pages of office action and 3 pages of office action translation.

Kasper et al., "Subscriber Authentication in Cellular Networks With Trusted Virtual Sims", 10th International Conference on Advanced Communication Technology, vol. 2, Feb. 17-20, 2008, pp. 903-908.

International Search Report received for corresponding Patent Cooperation Treaty Application No. PCT/IB2011/055949 dated Dec. 13, 2011, 7 pages.

Written Opinion for International Application No. PCT/IB2011/055949 dated Dec. 13, 2012.

Office Action for Chinese Application No. 201180075705.4 dated Mar. 31, 2016.

* cited by examiner

METHOD AND APPARATUS FOR SELECTIVELY ACTIVATING MULTIPLE SUBSCRIBER IDENTITY MODULES

RELATED APPLICATION

This application was originally filed as PCT Application No. PCT/IB2011/055949 filed on Dec. 23, 2011.

TECHNOLOGICAL FIELD

Example embodiments of the present invention relate generally subscriber identity modules (SIMs) and, more particularly, to the selective activation and deactivation of multiple SIMs.

BACKGROUND

Employees oftentimes work in shifts such that a first employee is working during a first shift, a second employee is working during a second shift and a third employee is working during a third shift. For example, bus drivers, nurses and other types of employees may work in shifts in order to perform the job responsibilities for a longer period of time than that worked by any of the individual employees. As such, schedules may be developed that identify the various employees and the shifts during which the employees will be at work.

To facilitate communication with an employee, an employee may carry a mobile terminal, such as a cellular telephone, a personal digital assistant (PDA), a pager or the like. In an instance in which multiple employees work in shifts, it is desirable to be able to communicate with the particular employee who is currently at work or on stand-by, but not with the other employees who are off work, thereby avoiding inconveniencing the other employees.

In some instances in which multiple employees work in shifts, efforts to establish communications with the employees who are currently at work may simply involve placing a call or otherwise communicating with one of the employees to determine if the employee is active. If the employee does not respond, it may be assumed that the employee is not at work and efforts to communicate with another employee may be undertaken. This process may continue until the employee who is currently at work responds. However, this process may result in a number of unsuccessful efforts to communicate with the employee who is currently at work, thereby being somewhat inefficient and potentially inconveniencing the employees who are off work but are nonetheless the subject of a call or other form of communication. Instead of communicating with the employees who work in shifts in a serial fashion, efforts to communicate with the employees who work in shifts may be undertaken in a simultaneous fashion, such as by placing calls to a number of mobile terminals of the employees in an effort to reach the employee who is currently at work. While this approach may result in successful communications with the employee who is at work in a quicker fashion, it may also be inefficient in that communications are attempted with a number of employees who are not at work.

Regardless of the technique by which communications with the employee who is currently at work are established, each of employees may carry multiple mobile terminals. For example, an employee may carry a personal mobile terminal as well as another mobile terminal for receiving work-related communications, particularly while the employee is at work. Having to carry multiple mobile terminals may be inconvenient for the employee, especially for those that use hands-free extensions.

BRIEF SUMMARY

A method, apparatus and computer program product are therefore provided according to an example embodiment of the present invention in order to selectively establish communications with one or more of a plurality of mobile terminals in accordance with a predefined criteria, such as a predefined schedule. As such, the method, apparatus and computer program product of one embodiment may facilitate communications with a shift worker who is currently actively working, while reducing, if not eliminating, instances in which shift workers who are not currently working are inadvertently contacted. The method, apparatus and computer program product of one example embodiment may therefore provide for more efficient and timely communications with a shift worker who is currently at work, while reducing inconveniences that may otherwise be associated with inadvertent communications with shift workers who are not currently at work, particularly in comparison to some systems that contact all shift workers with the worker on duty responding, which is inconvenient since the off-duty employees may not want to be contacted during that time and may not remember to silence their mobile terminals, e.g., at night time.

In one embodiment, a method is provided that includes maintaining, in a mobile terminal, at least a first subscriber identity module (SIM) and a second SIM mapped to different subscriber identification numbers. In this regard, the second SIM is mapped to the same subscriber identification number as the SIM of at least one other mobile terminal. The method of this embodiment also activates the second SIM in accordance with a predefined criteria and then subsequently deactivates the second SIM. For example, the second SIM may be activated and subsequently deactivated in accordance with a predefined schedule, such as a shift schedule, that identifies one or more time periods in which the second SIM is to be activated.

In another embodiment, an apparatus is provided that includes at least one processor and at least one memory including computer program code with the at least one memory and the computer program code being configured to, with the at least one processor, cause the apparatus to maintain, in a mobile terminal, at least a first subscriber identity module (SIM) and a second SIM mapped to different subscriber identification numbers. In this regard, the second SIM is mapped to the same subscriber identification number as the SIM of at least one other mobile terminal. The at least one memory and the computer program code of one embodiment are also configured to, with the at least one processor, cause the apparatus to activate the second SIM in accordance with a predefined criteria and then subsequently deactivate the second SIM. For example, the second SIM may be activated and subsequently deactivated in accordance with a predefined schedule, such as a shift schedule, that identifies one or more time periods in which the second SIM is to be activated.

In a further embodiment, a computer program product is provided that includes at least one non-transitory computer-readable storage medium having computer-executable program code instructions stored therein with the computer-executable program code instructions including program code instructions configured to maintain, in a mobile terminal, at least a first subscriber identity module (SIM) and a second SIM mapped to different subscriber identification numbers. In this regard, the second SIM is mapped to the same subscriber identification number as the SIM of at least one other mobile terminal. The computer-executable program code instructions of this embodiment may also include program code instructions that are configured to activate the second SIM in accordance with a predefined criteria and then subsequently deactivate the second SIM. For example, the second SIM may be activated and subsequently deactivated in accordance with a predefined schedule, such as a shift schedule, that identifies one or more time periods in which the second SIM is to be activated.

In yet another embodiment, an apparatus is provided that includes means for maintaining, in a mobile terminal, at least a first subscriber identity module (SIM) and a second SIM mapped to different subscriber identification numbers. In this regard, the second SIM is mapped to the same subscriber identification number as the SIM of at least one other mobile terminal. The apparatus of this embodiment may also include means for activating the second SIM in accordance with a predefined criteria and means for subsequently deactivating the second SIM. For example, the second SIM may be activated and subsequently deactivated in accordance with a predefined schedule, such as a shift schedule, that identifies one or more time periods in which the second SIM is to be activated.

In one embodiment, a method is provided that includes causing predefined criteria to be maintained that defines periods of activation and deactivation of each of a plurality of SIMs of different mobile terminals that are mapped to the same subscriber identification number. The method of one embodiment may also include causing the SIM of a respective mobile terminal to be activated during the period of activation of the SIM of the respective mobile terminal as defined by the predefined criteria. The method may also include subsequently causing the SIM of the respective mobile terminal to be deactivated upon a conclusion of the period of activation of the SIM of the respective mobile terminal as defined by the predefined criteria. The method of one embodiment may additionally include causing the SIM of another mobile terminal to be activated in conjunction with deactivation of the SIM of the respective mobile terminal and in accordance with the period of activation of the SIM of the other mobile terminal as defined by the predefined criteria. For example, the predefined criteria may include a predefined schedule that identifies the periods of activation and deactivation of each of a plurality of SIMs of different mobile terminals that are mapped to the same subscriber identification number.

In another embodiment, an apparatus is provided that includes at least one processor and at least one memory including computer program code with the at least one memory and the computer program code being configured to, with the at least one processor, cause the apparatus to cause predefined criteria to be maintained that defines periods of activation and deactivation of each of a plurality of SIMs of different mobile terminals that are mapped to the same subscriber identification number. The at least one memory and the computer program code of one embodiment are also configured to, with the at least one processor, cause the apparatus to cause the SIM of a respective mobile terminal to be activated during the period of activation of the SIM of the respective mobile terminal as defined by the predefined criteria. The at least one memory and the computer program code may also be configured to, with the at least one processor, cause the apparatus to subsequently cause the SIM of the respective mobile terminal to be deactivated upon a conclusion of the period of activation of the SIM of the respective mobile terminal as defined by the predefined criteria. The at least one memory and the computer program code of one embodiment are additionally configured to, with the at least one processor, cause the apparatus to cause the SIM of another mobile terminal to be activated in conjunction with deactivation of the SIM of the respective mobile terminal and in accordance with the period of activation of the SIM of the other mobile terminal as defined by the predefined criteria. For example, the predefined criteria may include a predefined schedule that identifies the periods of activation and deactivation of each of a plurality of SIMs of different mobile terminals that are mapped to the same subscriber identification number.

In a further embodiment, a computer program product is provided that includes at least one non-transitory computer-readable storage medium having computer-executable program code instructions stored therein with the computer-executable program code instructions including program code instructions configured to cause predefined criteria to be maintained that defines periods of activation and deactivation of each of a plurality of SIMs of different mobile terminals that are mapped to the same subscriber identification number. The computer-executable program code instructions of this embodiment may also include program code instructions that are configured to cause the SIM of a respective mobile terminal to be activated during the period of activation of the SIM of the respective mobile terminal as defined by the predefined criteria. The computer-executable program code instructions may also include program code instructions that are configured to subsequently cause the SIM of the respective mobile terminal to be deactivated upon a conclusion of the period of activation of the SIM of the respective mobile terminal as defined by the predefined criteria. The computer-executable program code instructions of one embodiment may additionally include program code instructions that are configured to cause the SIM of another mobile terminal to be activated in conjunction with deactivation of the SIM of the respective mobile terminal and in accordance with the period of activation of the SIM of the other mobile terminal as defined by the predefined criteria. For example, the predefined criteria may include a predefined schedule that identifies the periods of activation and deactivation of each of a plurality of SIMs of different mobile terminals that are mapped to the same subscriber identification number.

In yet another embodiment, an apparatus is provided that includes means for causing predefined criteria to be maintained that defines periods of activation and deactivation of each of a plurality of SIMs of different mobile terminals that are mapped to the same subscriber identification number. The apparatus of one embodiment may also include means for causing the SIM of a respective mobile terminal to be activated during the period of activation of the SIM of the respective mobile terminal as defined by the predefined criteria. The apparatus may also include means for subsequently causing the SIM of the respective mobile terminal to be deactivated upon a conclusion of the period of activation of the SIM of the respective mobile terminal as defined by the predefined criteria. The apparatus of one embodiment may additionally include means for causing the SIM of another mobile terminal to be activated in conjunction with deactivation of the SIM of the respective mobile terminal and in accordance with the period of activation of the SIM of the other mobile terminal as defined by the predefined criteria. For example, the predefined criteria may include a predefined schedule that identifies the periods of activation and deactivation of each of a plurality of SIMs of different mobile terminals that are mapped to the same subscriber identification number.

BRIEF DESCRIPTION OF THE DRAWINGS

Having thus described certain example embodiments of the present disclosure in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

Figure 1:
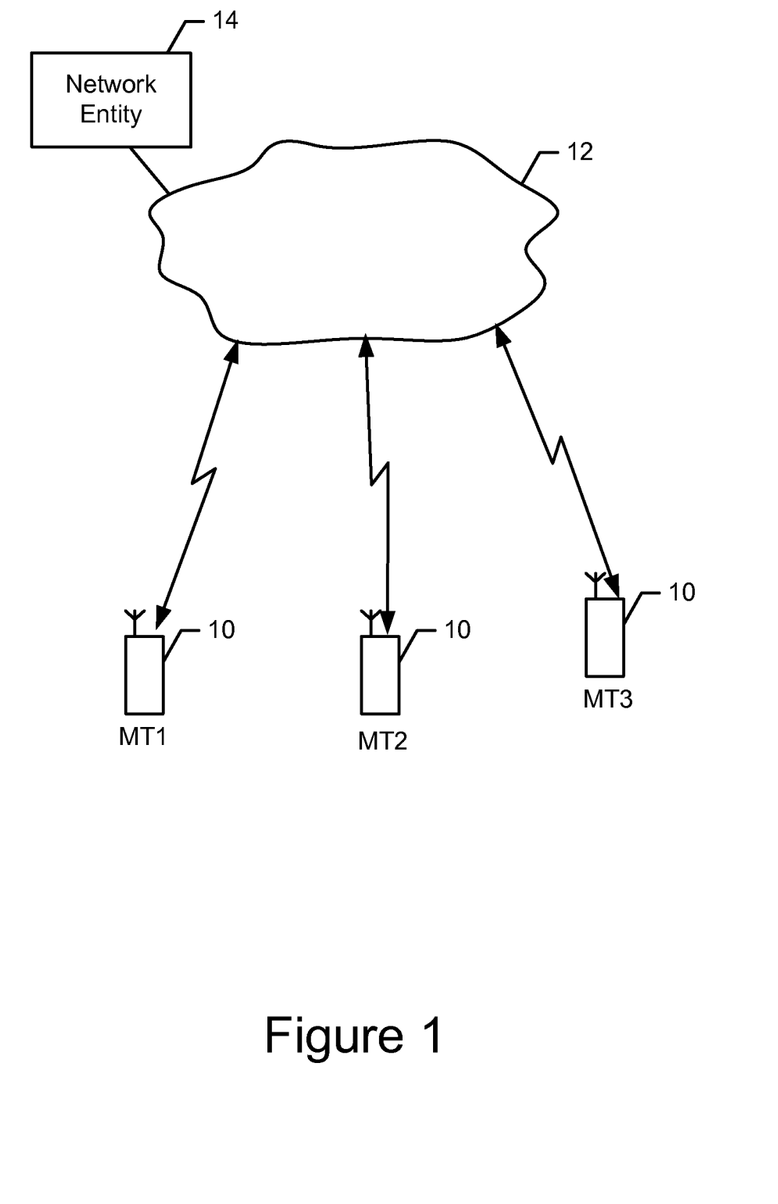
FIG. 1 is an illustration of a system that supports communications with multiple mobile terminals in accordance with an example embodiment of the present invention.

Referring now to FIG. 1, a system for supporting communications with a plurality of mobile terminals 10 designated as MT1, MT2 and MT3 in accordance with an example embodiment of the present invention is illustrated. For purposes of explanation, but not of limitation, each of the mobile terminals may be used by a different shift worker, such that mobile terminal MT1 is utilized by a first shift worker who works during a first shift, mobile terminal MT2 is utilized by a second shift worker who works during a second shift and mobile terminal MT3 is utilized by a third shift worker who works during a third shift. The mobile terminals may be of various types of mobile communication devices such as, for example, mobile telephones, PDAs, pagers, laptop computers, or any of numerous other hand held or portable communication devices, computation devices, content generation devices, content consumption devices, or combinations thereof. The mobile terminals may communicate via a network 12, such as a Long Term Evolution (LTE) network, an LTE-Advanced (LTE-A) network, a Global Systems for Mobile communications (GSM) network, a Code Division Multiple Access (CDMA) network, e.g., a Wideband CDMA (WCDMA) network, a CDMA2000 network or the like, a General Packet Radio Service (GPRS) network or other type of network. In one example embodiment, the system may also include a network entity 14, such as a server or other computing device, for coordinating the activation and de-activation of the mobile terminals of the shift workers, as described below. However, the system of other embodiments may not include a network entity for coordinating the activation and deactivation of the mobile terminals, and the mobile terminals may communicate between themselves so as to be controllably activated and deactivated without central coordination thereof. Additionally or alternatively, activation may take place directly by the user, such as via short-range communication, e.g., Bluetooth communication, via a message to the first SIM, as described below.

Figure 2:
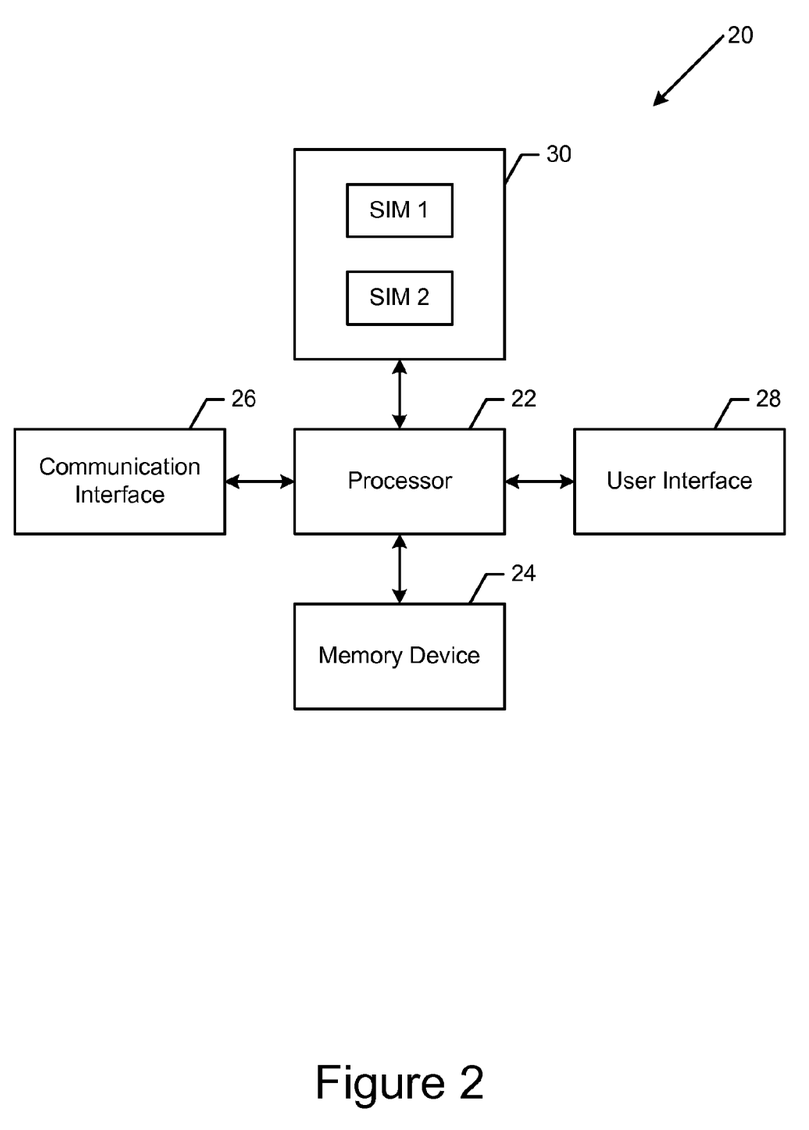
FIG. 2 is a block diagram of an apparatus from the perspective of a mobile terminal that may be configured in accordance with an example embodiment of the present invention.

Referring now to FIG. 2, an apparatus 20 that may be embodied by or otherwise associated with a mobile terminal 10 for selectively activating and deactivating a subscriber identity module (SIM) may include or otherwise be in communication with a processor 22, a memory device 24, a communication interface 26, a user interface 28 and a circuit card or other secure module 30 or other type of secure memory for storing a plurality of SIMs. A SIM, such as a code division multiple access (CDMA) SIM (CSIM), a Universal SIM (USIM), an internet protocol (IP) multimedia subsystem (IMS) SIM (ISIMs), a removable user identify module (RUIM) or the like, may store the network access application (NAA) that includes the cryptographic credentials that allows use of at least some of the services of the communication service provider. The NAA may be stored on a removable module or a non-removable module, e.g., a surface mounted or embedded chip.

In some example embodiments, the processor 22 (and/or co-processors or any other processing circuitry assisting or otherwise associated with the processor) may be in communication with the memory device 24 via a bus for passing information among components of the apparatus 20. The memory device may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The apparatus 20 may, in some embodiments, be embodied by a mobile terminal 10. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading. In the embodiment in which the apparatus 20 is embodied as a mobile terminal 10, the processor may be embodied by the processor of the mobile terminal.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a mobile terminal 10) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

Meanwhile, the communication interface 26 may be any means such as a device or circuitry embodied in either hardware or a combination of hardware and software that is configured to receive and/or transmit data from/to a network 12 and/or any other device or module in communication with the apparatus 20. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In some example embodiments, such as instances in which the apparatus 20 is embodied by a mobile terminal 10, the apparatus may include a user interface 28 that may, in turn, be in communication with the processor 22 to receive an indication of a user input and/or to cause provision of an audible, visual, mechanical or other output to the user. As such, the user interface may include, for example, a keyboard, a mouse, a joystick, a display, a touch screen(s), touch areas, soft keys, a microphone, a speaker, or other input/output mechanisms. Alternatively or additionally, the processor may comprise user interface circuitry configured to control at least some functions of one or more user interface elements such as, for example, a speaker, ringer, microphone, display, and/or the like. The processor and/or user interface circuitry comprising the processor may be configured to control one or more functions of one or more user interface elements through computer program instructions (e.g., software and/or firmware) stored on a memory accessible to the processor (e.g., memory device and/or the like).

Further, the circuit card or other secure module 30 or other type of secure memory may be configured to store a plurality of SIMs, as described below. The SIMs may be software SIMs of various types including, for example, CSIMs, USIMs, RUIMs and ISIMs. In one example embodiment, the circuit card is embodied by a universal integrated circuit card (UICC), an embedded UICC (eUICC) or the like in order to store the SIMs to facilitate identification and authentication of the user of the mobile terminal 10. In this regard, a SIM may include a unique serial number (ICCID) or other permanent identifier, an international mobile subscriber identity (IMSI), security authentication and ciphering information, temporary information related to the local network, a list of the services to which the user has access and/or passwords.

Figure 3:
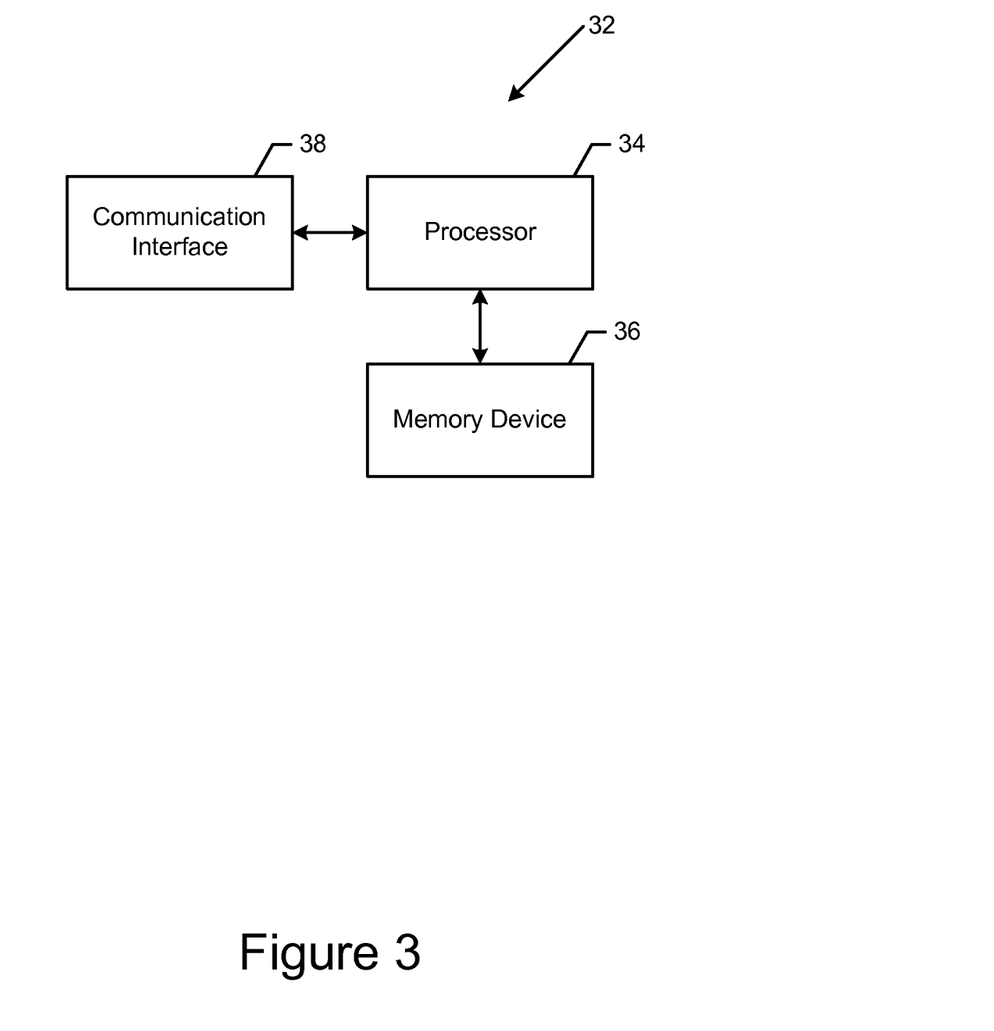
FIG. 3 is a block diagram of an apparatus from the perspective of a network entity that may be configured in accordance with an example embodiment of the present invention.

Referring now to FIG. 3, an apparatus 32 that may be embodied by or otherwise associated with a network entity 14 for selectively activating and deactivating a subscriber identity module (SIM) may include or otherwise be in communication with a processor 34, a memory device 36 and a communication interface 38. In some example embodiments, the processor (and/or co-processors or any other processing circuitry assisting or otherwise associated with the processor) may be in communication with the memory device via a bus for passing information among components of the apparatus. The memory device may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The apparatus 32 may, in some example embodiments, be embodied by a network entity 14, such as a server or other computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 34 may be embodied in a number of different ways. For example, the processor may be embodied as one or more of various hardware processing means such as a coprocessor, a microprocessor, a controller, a DSP, a processing element with or without an accompanying DSP, or various other processing circuitry including integrated circuits such as, for example, an ASIC, an FPGA, a MCU, a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading. In the embodiment in which the apparatus 32 is embodied as a network entity 14, the processor may be embodied by the processor of the network entity, such as the processor of a server or other computing device.

In an example embodiment, the processor 34 may be configured to execute instructions stored in the memory device 36 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a network entity 14) configured to employ an embodiment of the present invention by further configuration of the processor by instructions for performing the algorithms and/or operations described herein. The processor may include, among other things, a clock, an ALU and logic gates configured to support operation of the processor.

Meanwhile, the communication interface 38 may be any means such as a device or circuitry embodied in either hardware or a combination of hardware and software that is configured to receive and/or transmit data from/to a network 14 and/or any other device or module in communication with the apparatus 32. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, DSL, USB or other mechanisms.

Figure 4:
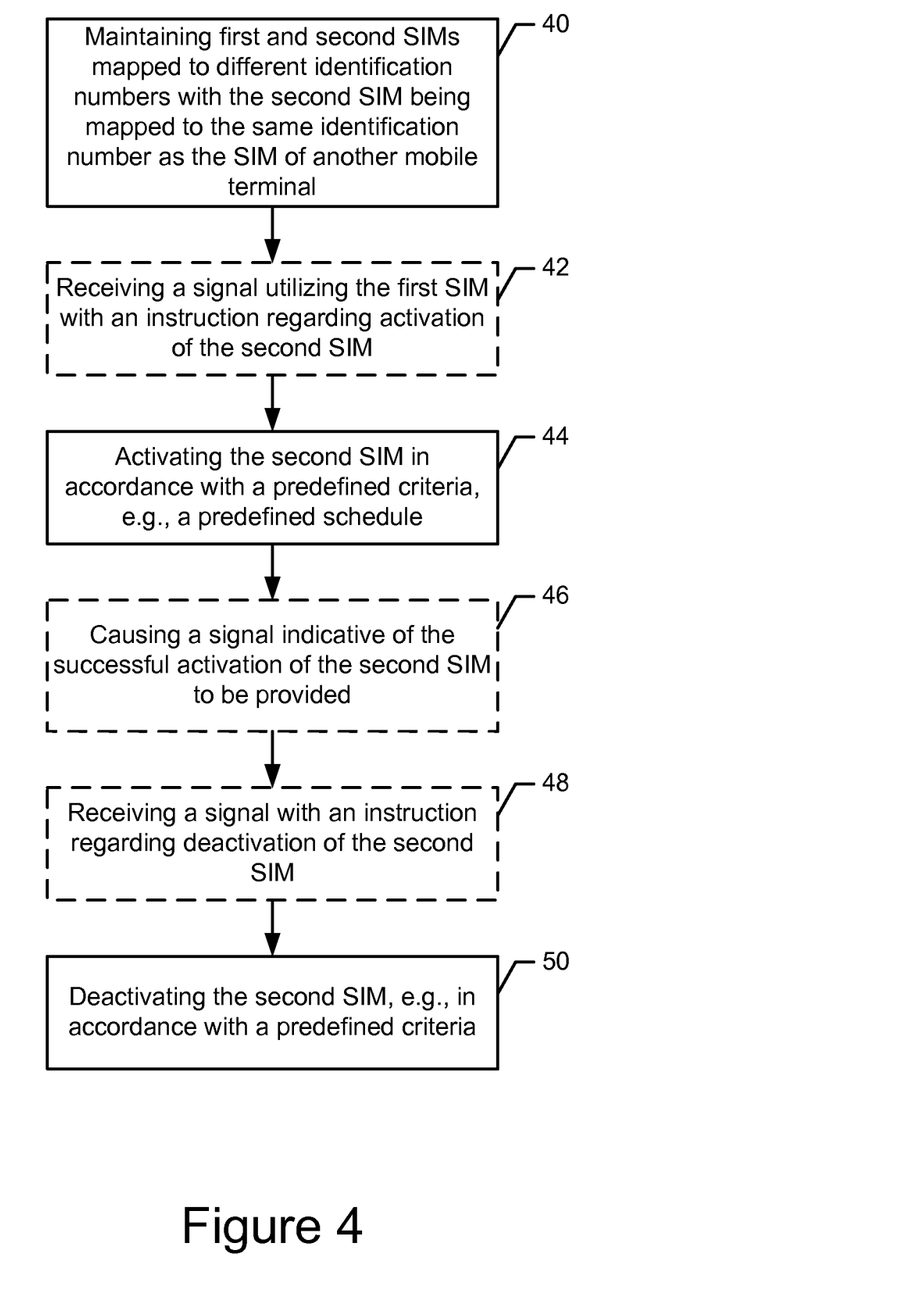
FIG. 4 is a flow chart of the operations performed from the perspective of a mobile terminal in accordance with an example embodiment of the present invention.

Referring now to FIG. 4, the operations performed by an apparatus 20 embodied by a mobile terminal 10 are illustrated. As described above in conjunction with FIG. 2, the apparatus embodied by the mobile terminal may include means, such as a processor 22, a circuit card or other secure module 30, e.g., UICC, eUICC, etc., or other secure memory or the like, for maintaining a plurality of SIMs, such as first and second SIMs, mapped to different subscriber identification numbers. See block 40 of FIG. 4. The SIMs may be mapped to various subscriber identification numbers that identify the mobile terminal and/or the user of the mobile terminal. For example, the plurality of SIMs may be mapped to different mobile station integrated services digital network numbers (MSISDNs). In one example, the first SIM may be mapped to an MSISDN that is associated with a private subscription of the user, e.g., the user's personal telephone number, while the second SIM is mapped to a different MSISDN that is associated with a subscription of the user's employer for whom the user performs shift work, e.g., the employer's telephone number for the position that is filled by the shift workers. As such, the second SIM may be mapped to the same subscriber identification number, such as the same MSISDN, as a SIM of at least one other mobile terminal. In this regard, the second SIM may be mapped to the same subscriber identification number, such as the same MSISDN, as the SIMs of the mobile terminals of the other users who also perform shift work in the same capacity for the same employer. As such, the subscriber identification number to which the second SIMs are mapped by be uniquely associated with the particular position or job that is performed by the shift workers, as opposed to the shift workers themselves. With reference to FIG. 1, the second SIMs of the mobile terminals designated as MT1, MT2 and MT3 may be mapped to the same subscriber identification number, that is, a subscriber identification number of their employer, since the users are employed by the same employer to perform shift work during shifts 1, 2 and 3, respectively.

The second SIMs of the mobile terminals 10 utilized by the users who perform shift work for the same employer may be controllably activated and deactivated such that the second SIM of the mobile terminal of the user who is currently working is activated, while the second SIMs of the other users who are not currently working are deactivated. Thus, communications, such as a telephone call, a short message service (SMS) message or the like, could be directed to the subscriber identification number, such as the MSISDN, associated with the position or job performed by the shift workers in order to communicate with the user who is currently working. As a result of the selective activation and deactivation of the second SIMs of the plurality of the mobile terminals, the communications, such as a telephone call, an SMS message or the like, may always be directed to the same subscriber identification number, such as the same MSISDN, in order to reach the user who is currently working without having to keep track of who is currently working and the different subscriber identification numbers assigned to each of the shift workers. Additionally, by storing both the SIM associated with the personal subscription of the user and the SIM associated with the shift work of the user, the user need carry only a single mobile terminal in order to receive calls of a personal nature and calls that are work-related.

In accordance with an example embodiment, the apparatus 20 embodied by or otherwise associated with the mobile terminal 10 may include means, such as the processor 22, a circuit card or other secure module 30, e.g., UICC, eUICC, etc., or other secure memory or the like, for causing the second SIM to be activated in accordance with a predefined criteria. See block 4 of FIG. 44. For example, the predefined criteria may be a predefined schedule that indicates the periods of time during which the second SIMs should be activated and deactivated. In the context of shift work, the predefined schedule may correlate to the shift schedule of the user such that the second SIM will be activated during the shift during which the user is at work, but will be deactivated during the shifts during which the user is not working.

Activation generally refers to a state in which a mobile terminal 10 successfully receives a communication request that is directed to a subscriber identification number of the mobile terminal. Conversely, deactivation may imply that a SIM is inactive, but may also refer to a state in which the binding between the MSISDN and the NAA is no longer performed in the network 12.

In regard to the example depicted in FIG. 1, the user of mobile terminal MT1 may work a shift from 08:00 to 16:00 and the user of the mobile terminal MT2 may work a shift from 16:00 to 24:00. As such, the first SIM that is mapped to an MSISDN that is associated with a private subscription of the user of the mobile terminal MT1 may be continually activated, while the second SIM that is mapped to an MSISDN that is associated with the employer is activated from 08:00 to 16:00, but is otherwise inactive. Similarly, the first SIM that is mapped to an MSISDN that is associated with a private subscription of the user of the mobile terminal MT2 may also be continually activated, while the second SIM that is mapped to an MSISDN that is associated with the employer is activated from 16:00 to 24:00, but is otherwise inactive.

The apparatus 20 embodied by the mobile terminal 10 may also include means, such the processor 22, the member device 24 or the like, for causing the predefined criteria, such as the predefined schedule, to be stored. In this example embodiment, the processor may access the predefined criteria, such the predefined schedule, and may then selectively cause the second SIM to be activated during a predefined period of activation and to be deactivated during a predefined period of deactivation. Alternatively, the predefined criteria may be maintained by another device, such as the network entity 14, e.g., a server or other computing device, or by another mobile terminal, such as another mobile terminal having a second SIM that is mapped to the same subscriber identification number. In these embodiments, the apparatus embodied by the mobile terminal may include means, such as the processor, the communication interface 26 or the like, for receiving a signal utilizing the first SIM with an instruction regarding activation of the second SIM. See block 42 of FIG. 4. In this regard, the signal may be received utilizing the first SIM since the second SIM would be deactivated prior to receipt of the signal. In response to the signal with an instruction regarding activation the second SIM, the apparatus, such as the processor, the circuit card or other secure module 30 or other secure memory or the like may cause the second SIM to be activated.

In one example described below, the network entity 14, such as a server or other computing device, may maintain the predefined criteria, such as the predefined schedule, and may cause a signal to be provided to the mobile terminal 10 using the first SIM of the mobile terminal with the instruction to activate the second SIM in an instance in which the predefined criteria, such as the predefined schedule, indicates that the mobile terminal is to be activated. In an alternative example embodiment, another mobile terminal having a second SIM is mapped to the same subscriber identification number may cause a signal to be transmitted to the mobile terminal using the first SIM of the mobile terminal with an instruction indicating that the second SIM of the mobile terminal is to be activated. In this regard, the other mobile terminal may maintain the predefined criteria, such that the predefined schedule, and may cause signals to be transmitted to the other mobile terminals in order to activate the second SIMs of the other mobile terminals in accordance with the predefined criteria such that the second SIM of each mobile terminal is activated during the period in which the user of the mobile terminal is at work. Alternatively, the other mobile terminal need not maintain the predefined criteria, such as the predefined schedule, and may, instead, be configured to cause a signal to be transmitted to the mobile terminal using the first SIM of the mobile terminal in order to activate the second SIM of the mobile terminal in conjunction with the deactivation of the second SIM of the other mobile terminal. Thus, the mobile terminal of a user who is leaving work may cause the second SIM of the mobile terminal of the user who is commencing work to be activated.

Regardless of the manner in which the second SIM of the mobile terminal 10 is activated, both the first and second SIMs of the mobile terminal may then be activated such that the mobile terminal may receive communications directed to the subscriber identification numbers, such as the MSISDNs, associated with either of the first SIM or the second SIM, such that the user may receive communications that are of both a personal nature and work-related. As such, the user need carry only a single mobile terminal so as to avoid the inconvenience otherwise created if the user had to carry multiple mobile terminals.

In one example embodiment, the apparatus 20 embodied by or otherwise associated with the mobile terminal 10 may include means, such as the processor 22, the communication interface 26 or the like, for causing a signal indicative of the successful activation the second SIM to be provided. See block 46 of FIG. 4. For example, the signal indicative of the successful activation the second SIM may be provided to a network entity 14, such as a server or other computing device, in an instance in which the network entity previously provided a signal indicating that the second SIM should be activated, thereby serving as a confirmation of the successful activation the second SIM of the mobile terminal. Alternatively, in an instance in which a signal instructing the activation of the second SIM of the mobile terminal was received from another mobile terminal, the signal indicative of the successful activation of the second SIM may be provided to the other mobile terminal. In this regard, the other mobile terminal may be configured so as to only deactivate its second SIM in response to the receipt of the signal indicating the successful activation of the second SIM of the mobile terminal. By deferring deactivation of the second SIM of the other mobile terminal until confirmation of the successful activation of the second SIM of the mobile terminal is received, it is insured that any communications directed to the subscriber identification number, such as the MSISDN, associated with the second SIMs of the plurality of mobile terminals will always be received by at least one of the mobile terminals and that they will not be a gap of service while switching between the mobile terminals.

The apparatus 20 embodied by or otherwise associated with the mobile terminal 10 may also include means, such as the processor 22, a circuit card or other secure module 30 or other secure memory or the like, for subsequently deactivating the second SIM. See block 50 of FIG. 4. The second SIM may be deactivated in accordance with the predefined criteria, such as the predefined schedule that identifies the time periods during which the second SIM is to be activated and deactivated. In one example embodiment, the predefined criteria, such as the predefined schedule, is maintained by the apparatus embodied by the mobile terminal, such as by being stored in the memory device 24. As such, the processor may access the predefined criteria, such as the predefined schedule, and may cause the second SIM to be deactivated in accordance with the predefined criteria. In an alternative embodiment, the predefined criteria, such as the predefined schedule, may be maintained external to the mobile terminal such that the apparatus embodied by the mobile terminal may include means, such as the processor, the communication interface 26 or the like, for receiving a signal with an instruction regarding deactivation of the second SIM based upon the predefined criteria, e.g., the predefined schedule of time periods of activation and deactivation. See block 48 of FIG. 4. For example, the predefined criteria, such as the predefined schedule, may be maintained by a network entity 14, such as a server or other computing device, that is configured to provide the signal including the instruction regarding deactivation of the second SIM based upon the predefined criteria. In an alternative embodiment, the apparatus, such as a processor, the communication interface or the like, may receive a signal with an instruction regarding deactivation the second SIM from another mobile terminal. In this regard, another one of the mobile terminals having a second SIM associated with the same subscriber identification number may maintain the predefined criteria, e.g., the predefined schedule, and may cause signals to be transmitted to the other mobile terminals in order to instruct the mobile terminals to activate and deactivate in accordance the predefined criteria.

In one example embodiment, the apparatus 20 embodied by or otherwise associated with a mobile terminal 10 may be configured to ensure that another one of the mobile terminals having a second SIM that is mapped to the same subscriber identification number is activated prior to deactivation the second SIM. In this embodiment, the apparatus embodied by or otherwise associated with another mobile terminal may include means, such as the processor 22, the communication interface 26 or the like, for causing a signal to be provided to the mobile terminal regarding activation of the SIM of the other mobile terminal. In this regard, the mobile terminal may maintain the predefined criteria, e.g., the predefined schedule, and may determine that the second SIM of the mobile terminal is to be deactivated while the second SIM of the other mobile terminal is to be activated, thereby triggering the transmission of a signal to the other mobile terminal instructing the activation of the second SIM of the other mobile terminal. In response, the apparatus embodied by or otherwise associated with the mobile terminal, such as the processor, the communication interface or the like, may receive a signal indicative of the activation of the second SIM of the other mobile terminal. In this embodiment, only once the mobile terminal has received confirmation of the activation of the second SIM of the other mobile terminal does the mobile terminal deactivate its second SIM. As such, the apparatus embodied by or otherwise associated with the mobile terminal of this embodiment may ensure that at least one of the mobile terminals having a second SIM associated with the same subscriber identification number is active in order to receive communications directed to the subscriber identification number.

As such, a plurality of mobile terminals 10 may include second SIMs that are associated with the same subscriber identification number, such as the same MSISDN.

By selectively activating and deactivating the SIMs of the mobile terminals, communications directed to the subscriber identification number may be received by at least one of the mobile terminals having a second SIM that is activated, without disturbing the other mobile terminals having second SIMs that are deactivated. Although the method, apparatus and computer program product of example embodiments of the present invention may be utilized in a variety of different contexts, the method, apparatus and computer program product of one example embodiment may be utilized in conjunction with mobile terminals of users who perform shift work such that the second SIMs of the mobile terminals that are associated with the same subscriber identification number may be activated and deactivated in accordance with the shift schedule of the user. As such, communications directed to the subscriber identification number that is associated with the position or job filled by the shift workers may be directed to the mobile terminal of the user who is currently at work without disturbing the mobile terminals of the other users who are off of work.

Figure 5:
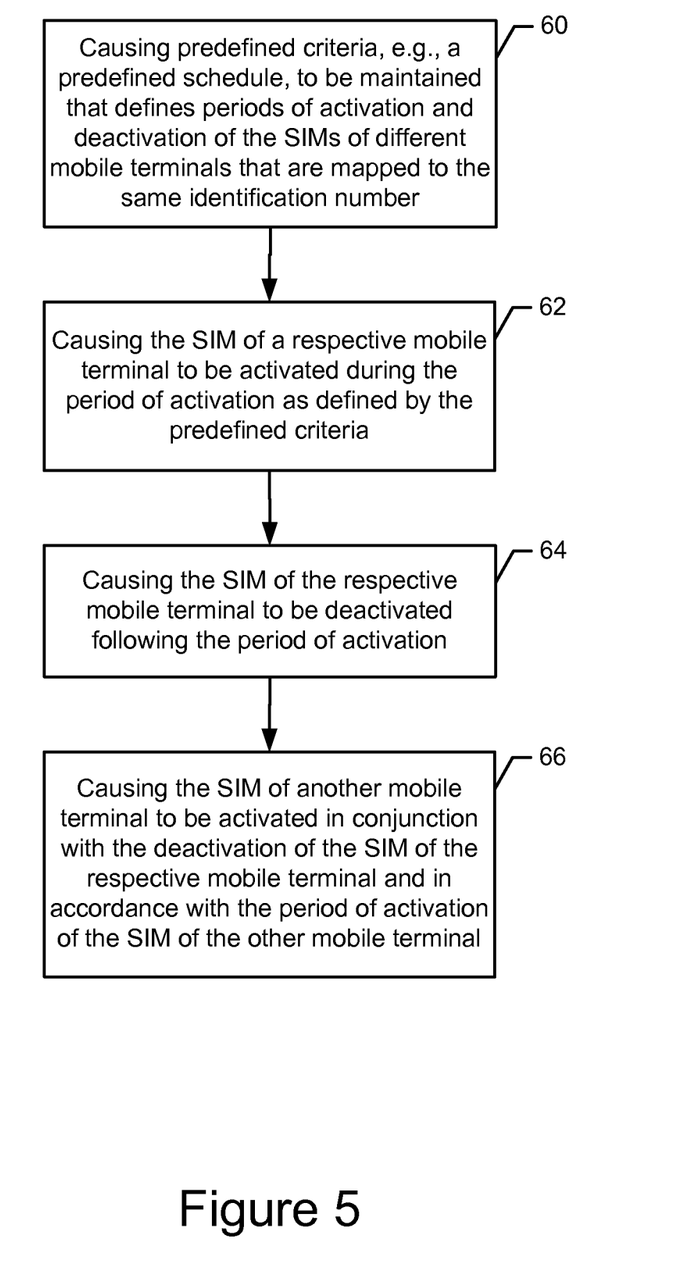
FIG. 5 is a flow chart of the operations performed from the perspective of a network entity in accordance with an example embodiment of the present invention

As noted above, the predefined criteria, such as the predefined schedule, may be maintained by a network entity 14, such as a server or other computing device, in one example embodiment. With reference to FIG. 5, the operations performed by an apparatus 32 embodied by or otherwise associated with the network entity of this embodiment are depicted. As shown, the apparatus embodied by or associated with the network entity may include means, such as the processor 34, the memory device 36 or the like, for causing predefined criteria, such as a predefined schedule, to be maintained. See block 60 of FIG. 5. The predefined criteria may define periods of activation and deactivation of the second SIMs of the plurality of mobile terminals 10 that are mapped to the same subscriber identification number, such as the same MSISDN.

In an instance in which a mobile terminal 10 is to be activated, such as at the beginning of a shift of the user of the mobile terminal, the apparatus 32 embodied by or associated with the network entity 14 of this embodiment may include means, such as the processor 34, the communication interface 38 or the like, for causing the second SIM of the respective mobile terminal to be activated during the period of activation as defined by the predefined criteria. See block 62 of FIG. 5. Thereafter, such as at the conclusion of the shift of the user, the apparatus embodied by or otherwise associated with the network entity may include means, such as the processor, the communication interface or the like, for causing the second SIM of the respective mobile terminal to be deactivated following the period of activation. See block 64 of FIG. 5.

In one example embodiment, the apparatus 32 embodied by or associated with the network entity 14 may also include means, such as the processor 34, the communication interface 38 or the like, for causing the second SIM of another mobile terminal to be activated in conjunction with the deactivation of the second SIM of the respective mobile terminal and in accordance with the period of activation of the second SIM of the other mobile terminal. See block 66 of FIG. 5. In one embodiment, for example, the apparatus embodied by the network entity may transition from the activation of the second SIM of a first mobile terminal to the second SIM of a second mobile terminal by first causing the second SIM of the second mobile terminal to be activated. In response to the receipt of a signal from the second mobile terminal confirming the activation of the second SIM of the second mobile terminal, the apparatus embodied by the network entity may then cause the second SIM of the first mobile terminal to be deactivated. In this manner, the network entity may ensure that at least one of the mobile terminals having a second SIM associated with the same subscriber identification number is always activated so as to receive communications directed to the subscriber identification number and to avoid the creation of a gap or lack of service during the transition period.

As described above, FIGS. 4 and 5 illustrate a flowchart of an apparatus, method, and computer program product from the perspective of a mobile terminal 10 and a network entity 14, respectively, according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as shown by the dashed boxes in FIG. 4. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings.

Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   maintaining, in a mobile terminal of a first user, at least a first subscriber identity module (SIM) and a second SIM mapped to different subscriber identification numbers, wherein the second SIM is mapped to the same subscriber identification number as the SIM of at least one other mobile terminal of at least one other user who shares a position with the first user, wherein the different subscriber identification numbers comprise a personal subscription and a professional subscription of the mobile terminal;
   activating the second SIM in accordance with a predefined criteria, wherein the predefined criteria comprises periods of activation and deactivation of each of a plurality of SIMs of different mobile terminals that are mapped to the same subscriber identification number such that communication is directed to the mobile terminal having the SIM that is both activated during the communication and mapped to the same subscriber identification number without requiring tracking of the user currently filling the position that is shared by the first user and the at least one other user; and
   subsequently deactivating the second SIM, wherein activating and subsequently deactivating the second SIM comprises activating and subsequently deactivating the second SIM in accordance with a predefined schedule that identifies one or more time periods in which the second SIM is to be activated, wherein subsequently deactivating the second SIM comprises causing a signal to be provided to at least one of the other mobile terminals regarding activation of the SIM of the other mobile terminal, receiving a signal indicative of activation of the SIM from the other mobile terminal and deactivating the second SIM in response thereto.

2. A method according to claim 1 wherein receiving the signal utilizing the first SIM comprises receiving the signal from a network entity or from one of the other mobile terminals.

3. A method according to claim 1 further comprising causing a signal indicative of a successful activation to be provided in conjunction with activation of the second SIM.

4. A method according to claim 1 wherein subsequently deactivating the second SIM comprises receiving a signal with an instruction regarding deactivation of the second SIM.

5. A method according to claim 4 wherein receiving the signal with an instruction regarding deactivation of the second SIM comprises receiving the signal from a network entity or from one of the other mobile terminals.

6. An apparatus comprising:
at least one processor; and
at least one non-transitory memory including computer program code, wherein the at least one non-transitory memory and the computer program code are configured to, with the at least one processor, cause the apparatus to at least:
maintain, in a mobile terminal of a first user, at least a first subscriber identity module (SIM) and a second SIM mapped to different subscriber identification numbers, wherein the second SIM is mapped to the same subscriber identification number as the SIM of at least one mobile terminal of at least one other user who shares a position with the first user, wherein the different subscriber identification numbers comprise a personal subscription and a professional subscription of the mobile terminal;
activate the second SIM in accordance with a predefined criteria, wherein the predefined criteria comprises periods of activation and deactivation of each of a plurality of SIMs of different mobile terminals that are mapped to the same subscriber identification number, such that communication is directed to the mobile terminal having the SIM that is both activated during the communication and mapped to the same subscriber identification number without requiring tracking of the user currently filling the position that is shared by the first user and the at least one other user; and
subsequently deactivate the second SIM, wherein the at least one non-transitory memory and the computer program code are configured to, with the at least one processor, cause the apparatus to:
activate and subsequently deactivate the second SIM by activating and subsequently deactivating the second SIM in accordance with a predefined schedule that identifies one or more time periods in which the second SIM is to be activated, and subsequently deactivate the second SIM by causing a signal to be provided to the at least one mobile terminal regarding activation of the SIM of the at least one mobile terminal, receiving a signal indicative of activation of the SIM from the at least one mobile terminal and deactivating the second SIM in response thereto.

7. An apparatus according to claim 6 wherein the at least one non-transitory memory and the computer program code are configured to, with the at least one processor, cause the apparatus to receive the signal utilizing the first SIM by receiving the signal from a network entity or from the at least one mobile terminal.

8. An apparatus according to claim 6 wherein the at least one non-transitory memory and the computer program code are further configured to, with the at least one processor, cause the apparatus to cause a signal indicative of a successful activation to be provided in conjunction with activation of the second SIM.

9. An apparatus according to claim 6 wherein the at least one non-transitory memory and the computer program code are configured to, with the at least one processor, cause the apparatus to subsequently deactivate the second SIM by receiving a signal with an instruction regarding deactivation of the second SIM.

10. An apparatus according to claim 9 wherein the at least one non-transitory memory and the computer program code are configured to, with the at least one processor, cause the apparatus to receive the signal with an instruction regarding deactivation of the second SIM by receiving the signal from a network entity or from the at least one mobile terminal.

11. An apparatus comprising:
at least one processor; and
at least one non-transitory memory including computer program code, wherein the at least one non-transitory memory and the computer program code are configured to, with the at least one processor, cause the apparatus to at least:
cause predefined criteria to be maintained that defines periods of activation and deactivation of each of a plurality of SIMs of different mobile terminals of a plurality of users who share a position that are mapped to the same subscriber identification number, wherein the different subscriber identification numbers comprise a personal subscription and a professional subscription of the mobile terminal;
cause the SIM of a respective mobile terminal to be activated during the period of activation of the SIM of the respective mobile terminal as defined by the predefined criteria;
subsequently cause the SIM of the respective mobile terminal to be deactivated upon a conclusion of the period of activation of the SIM of the respective mobile terminal as defined by the predefined criteria; and
cause the SIM of another mobile terminal to be activated in conjunction with deactivation of the SIM of the respective mobile terminal and in accordance with the period of activation of the SIM of the other mobile terminal as defined by the predefined criteria, such that communication is directed to the mobile terminal having the SIM that is both activated during the communication and mapped to the same subscriber identification number without requiring tracking of the user currently filling the position that is shared by the plurality of users, wherein the at least one non-transitory memory and the computer program code are configured to, with the at least one processor, cause the apparatus to:

receive a signal utilizing the SIM of the respective mobile terminal with an instruction regarding activation of the SIM of the another mobile terminal; and subsequently cause the SIM of the another mobile terminal to be deactivated by causing a signal to be provided to the at least one mobile terminal regarding activation of the SIM of the at least one mobile terminal, receiving a signal indicative of activation of the SIM from the at least one mobile terminal and causing the SIM of the another mobile terminal to be deactivated in response thereto.

12. An apparatus according to claim 11 wherein the at least one non-transitory memory and the computer program code are configured to, with the at least one processor, cause the apparatus to cause the predefined criteria to be maintained by causing a predefined schedule to be maintained that identifies the periods of activation and deactivation of each of a plurality of SIMs of different mobile terminals that are mapped to the same subscriber identification number.

13. An apparatus according to claim 11 wherein the at least one non-transitory memory and the computer program code are configured to, with the at least one processor, cause the apparatus to cause the SIM of the respective mobile terminal to be activated by causing a signal to be provided to the respective mobile terminal utilizing a different SIM with an instruction regarding activation.

14. An apparatus according to claim 11 wherein the at least one non-transitory memory and the computer program code are further configured to, with the at least one processor, cause the apparatus to receive a signal from the another mobile terminal indicative of a successful activation, and wherein the at least one non-transitory memory and the computer program code are configured to, with the at least one processor, cause the apparatus to cause the SIM of the respective mobile terminal to be deactivated by causing the SIM of the respective mobile terminal to be deactivated in response to receipt of the signal from the another mobile terminal indicative of the successful activation.

* * * * *

UNITED STATES PATENT AND TRADEMARK OFFICE
CERTIFICATE OF CORRECTION

PATENT NO. : 9,763,080 B2  
APPLICATION NO. : 14/367933  
DATED : September 12, 2017  
INVENTOR(S) : Silke Holtmanns Page 1 of 1

It is certified that error appears in the above-identified patent and that said Letters Patent is hereby corrected as shown below:

On the Title Page

Column 1,
Item (87), in "PCT Pub. No.", Line 1, "WO03/056855" should read --WO2013/093574--.
Item (87), in "PCT Pub. Date", Line 1, "Jul. 10, 2003" should read --Jun. 27, 2013--.

Column 2,
Item (57), under "Abstract", Line 6, "SIM is" should read --SIM--.

Signed and Sealed this
Eighth Day of May, 2018

Andrei Iancu
*Director of the United States Patent and Trademark Office*